(No Model.)
P. P. & J. DUSTRUD.
CUTTER ATTACHMENT FOR FORKS.
No. 517,796. Patented Apr. 3, 1894.
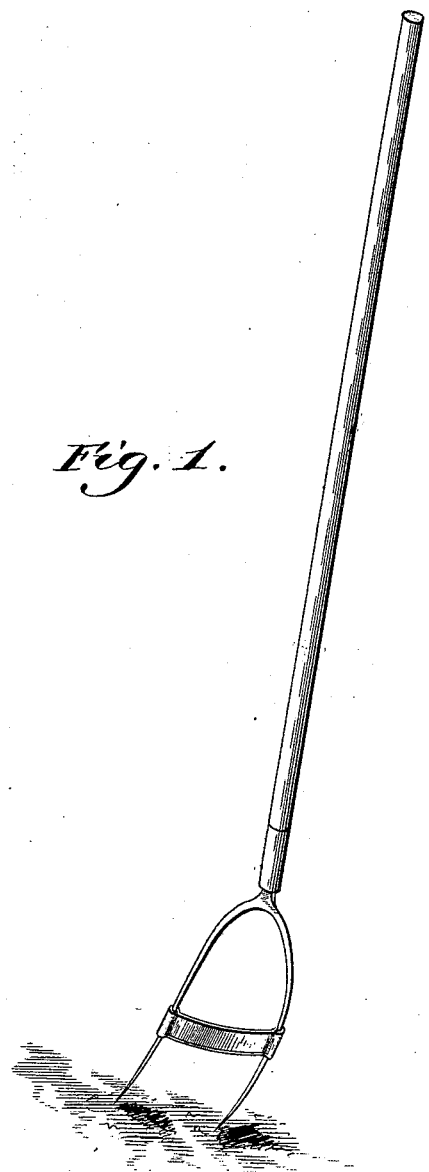
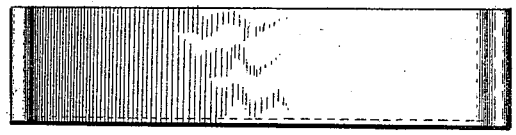

UNITED STATES PATENT OFFICE.

PETER P. DUSTRUD AND JULIUS DUSTRUD, OF SACRED HEART, MINNESOTA.

CUTTER ATTACHMENT FOR FORKS.

SPECIFICATION forming part of Letters Patent No. 517,796, dated April 3, 1894.

Application filed July 8, 1893. Serial No. 479,918. (No model.)

*To all whom it may concern:*

Be it known that we, PETER P. DUSTRUD and JULIUS DUSTRUD, citizens of the United States of America, residing at Sacred Heart, in the county of Renville and State of Minnesota, have invented certain new and useful Improvements in Cutter Attachments for Forks, of which the following is a specification, reference being had therein to the accompanying drawings.

This invention has relation to agricultural implements and particularly to that class known as attachments for forks and the like.

The object of the invention is to provide a simple device which may be attached to the pitch fork tines, thereby converting the same into a cutting instrument for cutting grass, weeds and the like.

Furthermore, the invention consists in a simple and inexpensive device which can be readily applied and detached to the tines of a fork of the well known and simple construction, making an efficient and durable device for the purposes stated.

The invention finally consists in the details of construction hereinafter to be more fully described and specifically pointed out in the claims.

In describing the invention in detail reference is had to the accompanying drawings forming a part of this specification wherein like letters of reference indicate similar parts throughout the several views.

Figure 1. is a perspective of a fork with our improved cutter attached thereto. Fig. 2. is an enlarged detail view of the cutter. Fig. 3, is a top view of the same.

In the drawings,—A, indicates the fork proper; B, B, the tines of the same.

C, represents the cutter having at each end eyelets c, c, for the reception of the tines of the fork, said eyelets being formed at an angle to correspond with the tines of the fork.

The cutter C, as will be observed by referring to Fig. 3, of the drawings, is formed so as to curve slightly which tends to brace the same and increase its durability, and provided with a knife edge D.

The operation of the device will be readily understood from the foregoing description, and it will be particularly noted that the cutter may be attached in any suitable manner without departing from the spirit of this invention.

Having fully described our invention, what we claim as new, and desire to secure by Letters Patent, is—

1. In an agricultural implement, a fork having a cutter, said cutter being provided with eyelets for the reception of the fork tines, substantially as described.

2. An agricultural implement consisting of a fork having a removable cutter, said cutter being slightly curved and provided with eyelets at each end for the reception of the fork tines, substantially as described.

3. In an agricultural implement, a fork having a removable cutter, slightly curved, with a knife edge, the ends of said cutter having eyelets to engage the fork tines, substantially as described.

In testimony whereof we affix our signatures in presence of two witnesses.

P. P. DUSTRUD.
JULIUS DUSTRUD.

Witnesses:
G. T. CHRISTIANSON,
JULIA CHRISTIANSON.